(12) United States Patent
Ambrosina et al.

(10) Patent No.: US 7,007,707 B2
(45) Date of Patent: *Mar. 7, 2006

(54) MASS FLOW RATIO SYSTEM AND METHOD

(75) Inventors: Jesse Ambrosina, Topsfield, MA (US); Nicholas E. Kottenstette, Newburyport, MA (US); Ali Shajii, Canton, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/816,084

(22) Filed: Apr. 1, 2004

(65) Prior Publication Data

US 2004/0187928 A1    Sep. 30, 2004

Related U.S. Application Data

(63) Continuation of application No. 10/037,882, filed on Jan. 4, 2002, now Pat. No. 6,766,260.

(51) Int. Cl.
G05D 11/13 (2006.01)
G05D 7/06 (2006.01)

(52) U.S. Cl. ................ 137/9; 137/101.19; 137/118.04; 137/487.5; 137/883

(58) Field of Classification Search ........... 137/101.19, 137/9, 118.04, 118.06, 486, 487.5, 883; 700/282, 700/285; 702/45

See application file for complete search history.

(56) References Cited

U.S. PATENT DOCUMENTS

| | | | |
|---|---|---|---|
| 1,767,588 A | 6/1930 | Hutton | |
| 1,886,575 A | 11/1932 | O'Connor | |
| 2,288,297 A | 6/1942 | Naiman | |
| 2,314,152 A | 3/1943 | Mallory | |
| 2,638,912 A | 5/1953 | Lee | |
| 2,661,756 A | 12/1953 | Noon et al. | |
| 2,780,414 A | 2/1957 | De Heer | |
| 3,092,127 A | 6/1963 | Bracken | |
| 3,438,385 A | 4/1969 | Nogami | |
| 3,556,126 A | 1/1971 | Oswald et al. | |
| 3,762,428 A | 10/1973 | Beck et al. | |

(Continued)

FOREIGN PATENT DOCUMENTS

GB        957055        5/1964

(Continued)

OTHER PUBLICATIONS

General Purpose Mass-Flo Controller (Type 1179A), MKS Instruments, Bulletin 1179A-Mar. 2000 (4 pages).

(Continued)

Primary Examiner—Ramesh Krishnamurthy
(74) Attorney, Agent, or Firm—McDermott Will & Emery LLP (57) ABSTRACT

A system for dividing a single mass flow, including an inlet adapted to receive the single mass flow and at least two flow lines connected to the inlet. Each flow line includes a flow meter and a valve. The system also includes a controller programmed to receive a desired ratio of flow through a user interface, receive signals indicative of measured flow from the flow meters, calculate an actual ratio of flow through the flow lines based upon the measured flows, and compare the actual ratio to the desired ratio. The controller is also programmed to calculate the desired flow through at least one of the flow lines if the actual ratio is unequal to the desired ratio, and provide a signal indicative of the desired flow to at least one of the valves.

39 Claims, 7 Drawing Sheets

U.S. PATENT DOCUMENTS

| | | |
|---|---|---|
| 4,369,031 A | 1/1983 | Goldman et al. |
| 5,031,674 A | 7/1991 | Mack |
| 5,165,450 A | 11/1992 | Marrelli |
| 5,240,046 A | 8/1993 | Mack |
| 5,307,833 A | 5/1994 | Stoy et al. |
| 5,449,495 A | 9/1995 | Goto |
| 5,453,124 A | 9/1995 | Moslehi et al. |
| 5,927,321 A | 7/1999 | Bergamini |
| 6,210,482 B1 * | 4/2001 | Kitayama et al. ............ 118/715 |
| 6,333,272 B1 | 12/2001 | McMillin et al. |
| 6,389,364 B1 * | 5/2002 | Vyers ............................ 702/45 |
| 6,418,954 B1 * | 7/2002 | Taylor et al. .................... 137/9 |
| 6,662,817 B1 * | 12/2003 | Yamagishi et al. ............. 137/9 |
| 6,752,166 B1 * | 6/2004 | Lull et al. ....................... 137/9 |
| 6,766,260 B1 * | 7/2004 | Ambrosina et al. ........... 702/45 |
| 2002/0038669 A1 | 4/2002 | Yamagishi et al. |

FOREIGN PATENT DOCUMENTS

| | | |
|---|---|---|
| JP | 358151614 A * | 9/1983 |
| JP | 02000330643 A * | 11/2000 |
| WO | 02/084422 | 10/2002 |
| WO | 02/084422 A2 | 10/2002 |

OTHER PUBLICATIONS

Types 246 & 247 Single & Four Channel Power Supply/Readout, MKS Instruments, May 1998 (2 pages).

Pressure/Flow Control Module (Type 250E), MKS Instruments, Bulletin 250-May 2000 (4 pages).

Search Report - GB 0300036.1.

* cited by examiner

| PIN | ASSIGNMENT | DESCRIPTION |
|---|---|---|
| 1 | NC | |
| 2 | FLOW RATIO OUTPUT | 0-5 VOLTS, 5mA MAX 1=1:1, 5=10:1 |
| 3 | NC | |
| 4 | VALVES OPEN | TTL LOW=VALVE OPEN |
| 5 | POWER COMMON | POWER SUPPLY RETURN |
| 6 | -15 VDC SUPPLY | 1% REGULATED 1 AMP MAX |
| 7 | +15 VDC SUPPLY | 1% REGULATED 1 AMP MAX |
| 8 | FLOW RATIO COMMAND | 0-5 VOLTS |
| 9 | ALARM | ALPHA OUT OF RANGE |
| 10 | NC | |
| 11 | SIGNAL COMMON | |
| 12 | SIGNAL COMMON | |
| 13 | DISABLE | TTL LOW DISABLES THE DEVICE (VALVES SHUT) |
| 14 | RATIO RANGE SWITCH | LOW=ALPHA FROM 0.1:1  HIGH=1:10 |
| 15 | CHASSIS GROUND | |

MASS FLOW RATIO SYSTEM AND METHOD

CROSS REFERENCE TO RELATED APPLICATION

The present application is a continuation of U.S. patent application Ser. No. 10/037,882, filed on Jan. 4, 2002 now U.S. Pat. No. 6,766,260, which is assigned to the assignee of the present application and incorporated herein by reference.

FIELD OF DISCLOSURE

The present disclosure relates generally to semiconductor processing equipment and, more particularly, to systems, devices, and methods for delivering contaminant-free, precisely metered quantities of process gases to semiconductor process chambers. Even more particularly, the present disclosure relates to a system and method for dividing a single mass flow into a desired ratio of two or more flows.

BACKGROUND OF DISCLOSURE

The fabrication of semiconductor devices often requires the careful synchronization and precisely measured delivery of as many as a dozen gases to a process chamber. Various recipes are used in the fabrication process, and many discrete processing steps, where a semiconductor device is cleaned, polished, oxidized, masked, etched, doped, metalized, etc., can be required. The steps used, their particular sequence, and the materials involved all contribute to the making of particular devices.

Accordingly, wafer fabrication facilities are commonly organized to include areas in which chemical vapor deposition, plasma deposition, plasma etching, sputtering and other similar gas manufacturing processes are carried out. The processing tools, be they chemical vapor deposition reactors, vacuum sputtering machines, plasma etchers or plasma enhanced chemical vapor deposition, must be supplied with various process gases. Pure gases must be supplied to the tools in contaminant-free, precisely metered quantities.

In a typical wafer fabrication facility the gases are stored in tanks, which are connected via piping or conduit to a gas box. The gas box delivers contaminant-free, precisely metered quantities of pure inert or reactant gases from the tanks of the fabrication facility to a process tool. The gas box, or gas metering system includes a plurality of gas paths having gas metering units, such as valves, pressure regulators and transducers, mass flow controllers and filters/purifiers. Each gas path has its own inlet for connection to separate sources of gas, but all of the gas paths converge into a single outlet for connection to the process tool.

Sometimes dividing the combined process gases equally among multiple process chambers, or among separate portions of a single process chamber, is desired. In such cases, the single outlet of the gas box is connected to secondary flow paths. To insure that the primary flow of the outlet of the gas box is divided equally among the secondary flow paths, flow restrictors are placed in each secondary flow path.

What is still desired, however, is a mass flow ratio system and method for dividing a single flow into a desired ratio of two or more flows. Preferably, the system and method will operate independently of the gas or gases controlled. In addition, the system and method preferably will not disturb the performance of any upstream mass flow controllers.

SUMMARY OF DISCLOSURE

Accordingly, the present disclosure provides a system for dividing a single mass flow into two or more secondary mass flows of desired ratios. The system includes an inlet adapted to receive the single mass flow and at least two secondary flow lines connected to the inlet. Each flow line includes a flow meter measuring flow through the flow line and providing a signal indicative of the measured flow, and a valve controlling flow through the flow line based upon receiving a signal indicative of desired flow rate.

The system also includes a user interface adapted to receive at least one desired ratio of flow, and a controller connected to the flow meters, the valves, and the user interface. The controller is programmed to receive the desired ratio of flow through the user interface, receive the signals indicative of measured flow from the flow meters, calculate an actual ratio of flow through the flow lines based upon the measured flow, and compare the actual ratio to the desired ratio. The controller is also programmed to calculate the desired flow through at least one of the flow lines if the actual ratio is unequal to the desired ratio, and provide a signal indicative of the desired flow to at least one of the valves.

The present disclosure also provides a method for dividing a single mass flow into two or more secondary mass flows of desired ratios. The method includes dividing a single mass flow into at least two secondary flow lines, measuring mass flow through each flow line, receiving at least one desired ratio of mass flow, and calculating an actual ratio of flow through the flow lines based upon the measured flows. If the actual ratio does not equal the desired ratio, the method also includes calculating a desired flow through at least one of the flow lines, and regulating the actual flow in that flow line to the desired flow.

The system and method of the present disclosure provide the benefit of operating independently of the gas or gases controlled. In addition, the system and method do not disturb the performance of any upstream mass flow controllers.

These and other features and advantages of the present disclosure will become more apparent to those of ordinary skill in the art after reading the following detailed description of the preferred embodiments, which are illustrated in the attached drawing figures.

BRIEF DESCRIPTION OF DRAWINGS

Like reference characters designate identical or corresponding components and units throughout the several views.

DETAILED DESCRIPTION OF DISCLOSURE

Figure 1:
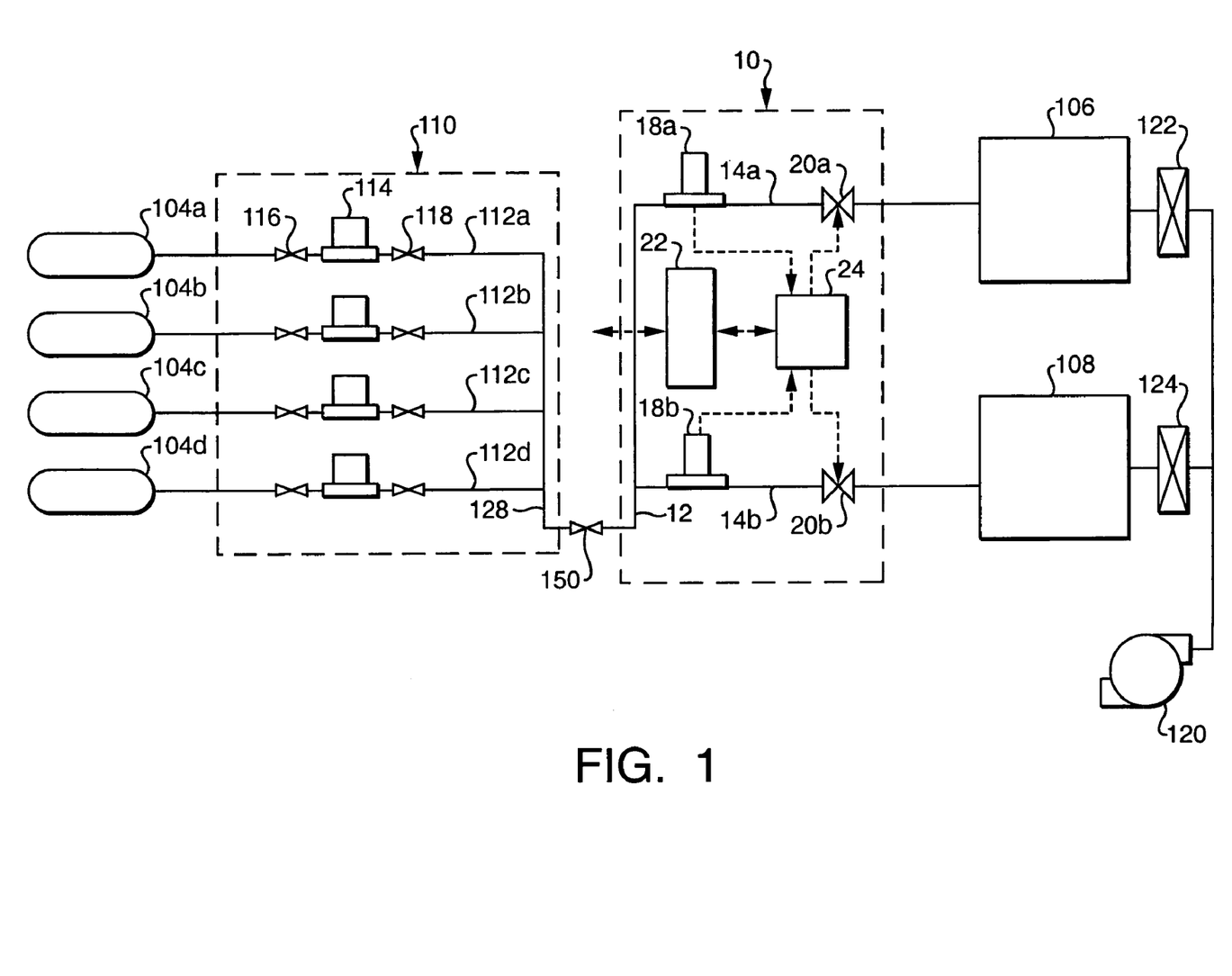
FIG. 1 is a schematic illustration of a mass flow ratio system constructed in accordance with the present disclosure, and shown connected between a gas metering box and two process chambers.
Figure 2:
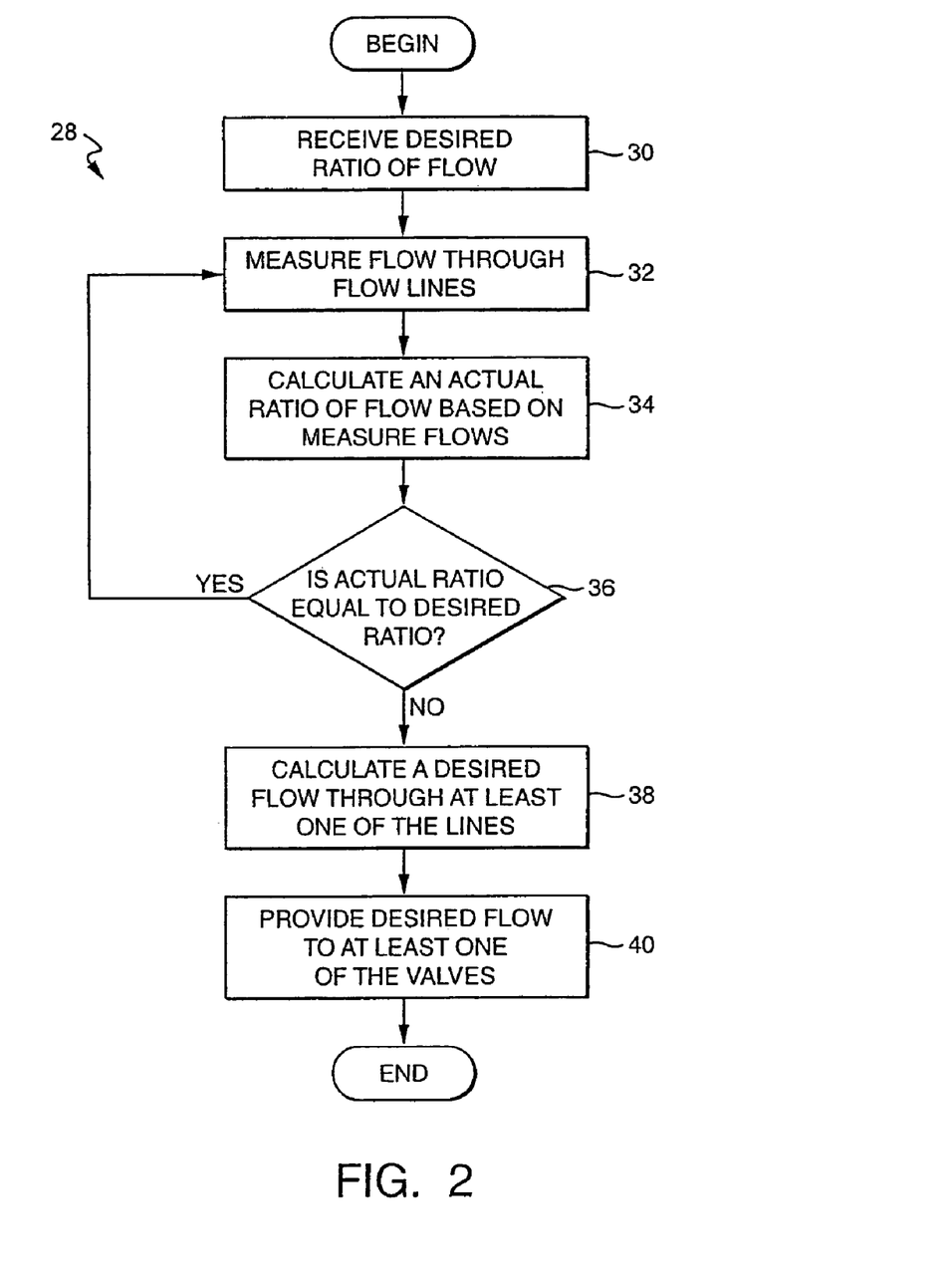
FIG. 2 is a flow chart of a method for dividing flow for the system of FIG. 1.

Referring to FIGS. 1 and 2, the present disclosure provides a mass flow ratio system 10 and method 28 for dividing a single mass flow into a desired ratio of two or more mass flows. The system 10 and method 28 are particularly intended for use with gas metering systems for delivering contaminant-free, precisely metered quantities of process and purge gases to semiconductor process chambers. The presently disclosed system 10 and method 28 provide the benefit of operating independently of the gas or gases controlled, and of operating without disturbing the performance of any upstream mass flow controllers.

Figure 7:
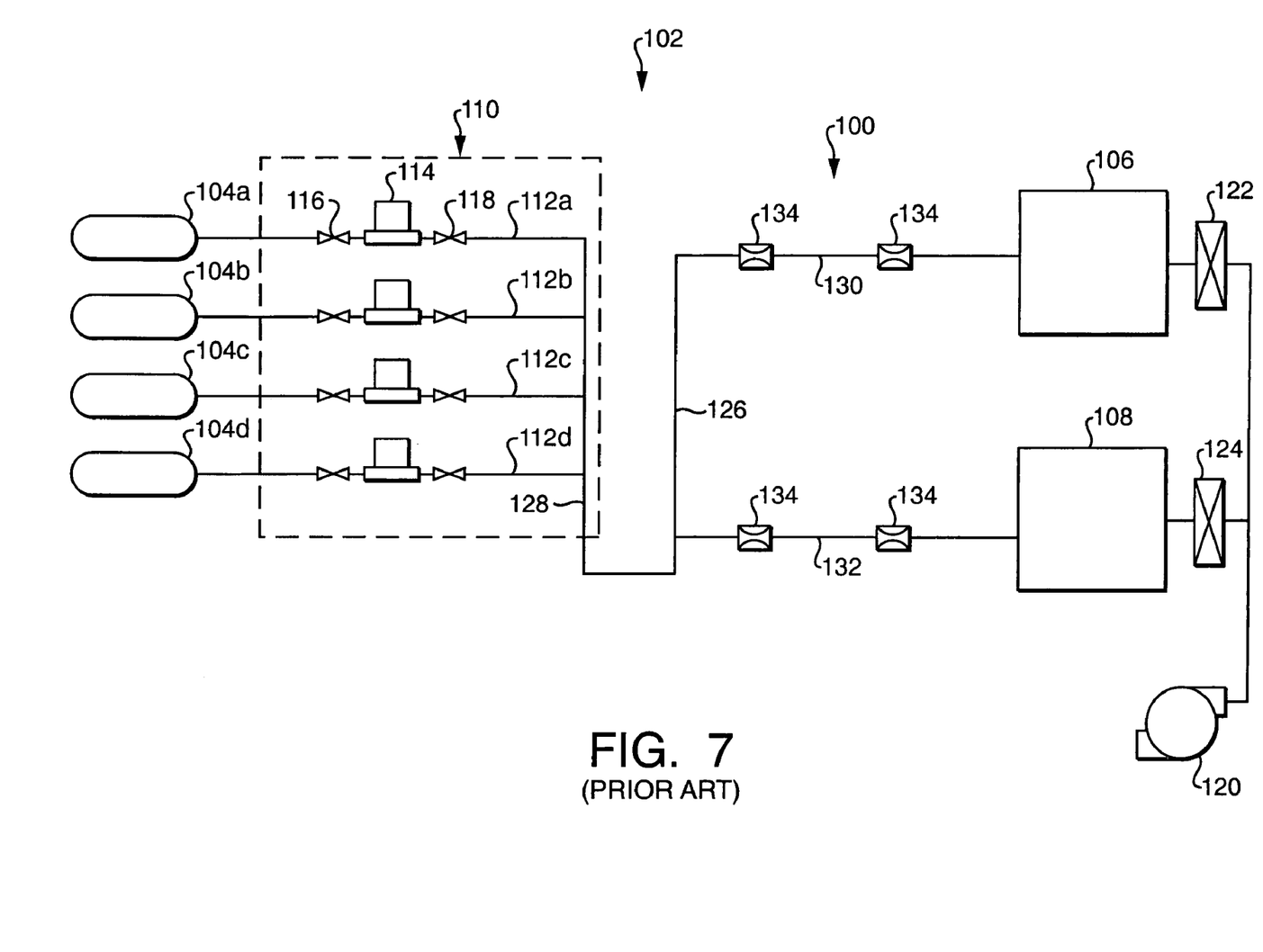
FIG. 7 is a schematic illustration of two flow paths constructed in accordance with the prior art and connected between a gas metering box and two process chambers.

Referring first to FIG. 7, however, an existing system 100 for dividing flow according to the prior art is shown for comparison. The system 100 is incorporated in a gas metering system 102 that receives multiple gases, including both process gases and a purge gas, from gas supplies (e.g., gas tanks) 104a, 104b, 104c, 104d and then precisely meters the gases to two process chambers 106, 108 (alternatively, the gases can be metered to different injectors or areas of a single process chamber). The gas metering system 102 includes a gas box 110 having a plurality of gas sticks 112a, 112b, 112c, 112d (while four sticks are shown, the gas box can include more or less than four).

Each stick includes, for example, a mass flow controller (MFC) 114, a valve 116 positioned before the MFC and a valve 118 positioned after the MFC. The gas sticks 112a, 112b, 112c, 112d are separately connected to the gas sources 104a, 104b, 104c, 104d and provide controllable gas passageways so that a contaminant-free, precisely metered amount of a gas, or combination of gases, can be supplied from the gas metering system 102 to the process chambers 106, 108. Although not shown, the sticks 112a, 112b, 112c, 112d can also each be provided with other components for monitoring or controlling gases, such as filters, purifiers, and pressure transducers and controllers. The sticks 112a, 112b, 112c, 112d connect together, in an outlet manifold 128 for example, to allow the gas flows from each stick to be mixed if desired prior to leaving the gas box.

A vacuum pump 120 is connected to the process chambers 106, 108 through gate valves 122, 124. During operation, the vacuum pump 120 draws gas from the gas sources 104a, 104b, 104c, 104d, through the gas metering system 102 and into the process chambers 106, 108.

The prior art system 100 for dividing flow between the at least two process chambers 106, 108 includes an inlet manifold, or line 126 connected to the outlet manifold 128 of the gas box 110, first and second flow lines 130, 132 extending from the inlet 126 to the process chambers 106, 108, and restrictors 134 placed in each flow line. In order to accurately control the flow rates through the first and the second lines 130, 132, the smallest cross-sectional flow area (e.g., diameter) of the restrictors 134 must be larger than any other restrictions in the first and the second flow lines 130, 132. Because restrictors 134 are used to control the flow rates, the upstream pressure (i.e., the pressure of the gas delivery system 102 prior to the flow dividing system 100) must be kept relatively high (e.g., 30 to 40 PSIA). Thus, in situations where it is preferable to keep the upstream pressure relatively low (e.g., 15 PSIA or less), for safety or other reasons, the system 100 of the prior art is not accurate in dividing and regulating flow. Furthermore, it is not possible to change the flow ratios between the flow lines 130, 132 without changing the restrictors 134, which can cause system downtime.

Figure 8:
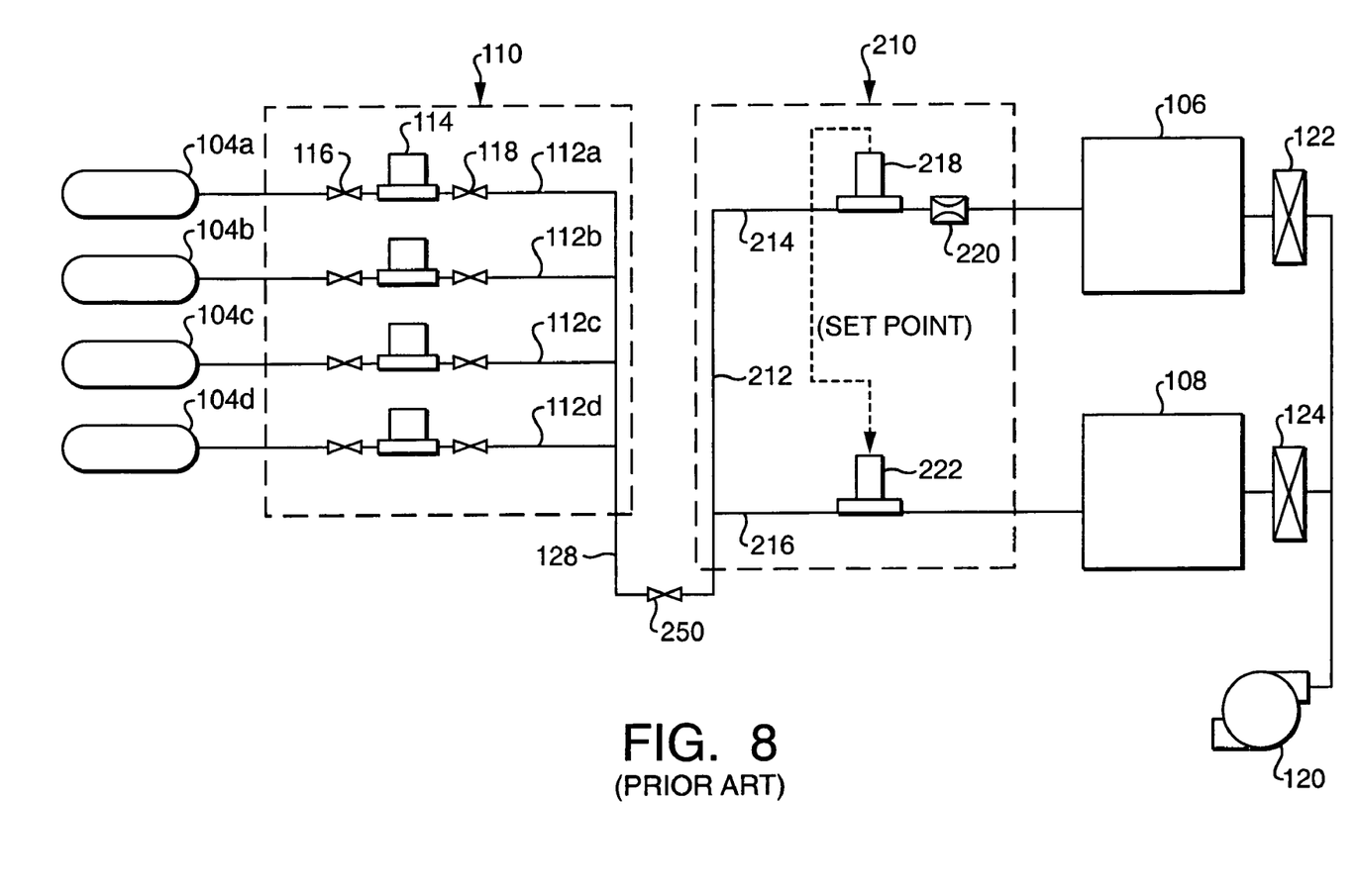
FIG. 8 is a schematic illustration of an existing mass flow divider connected between a gas metering box and two process chambers.

Referring to FIG. 8, an existing flow dividing system 210 is shown. The system 210 is described in greater detail in U.S. patent application Ser. No. 09/836,748, filed Apr. 17, 2001, now U.S. Pat. No. 6,418,954, which issued Jul. 16, 2002, is assigned to the assignee of the present invention and is incorporated in its entirety herein by reference. The system 210 includes an inlet line or manifold 212 for receiving the single gas flow from the outlet manifold 128 of the gas box 110, and first and second flow lines 214, 216 connected to the inlet 212. A mass flow meter 218 measures gas flow through the first line 214 and provides a signal indicative of the measured flow rate. A restrictor 220 restricts gas flow through the first line 214 to a desired flow rate, and has a smallest cross-sectional flow area selected to provide an upstream pressure high enough to allow the mass flow meter 218 to operate properly and lower than a predetermined upper pressure limit. The system also has a mass flow controller 222 controlling gas flow through the second line 216. The mass flow controller 222 receives the signal indicative of the measured flow rate from the mass flow meter 218 and maintains a flow rate through the second line 216 based on the signal.

Preferably, the smallest cross-sectional flow area of the restrictor 220 is selected such that the predetermined upper pressure limit is equal to about 15 PSIA. In addition, the mass flow meter 218 and the mass flow controller 222 are preferably provided with the same flow range. In the flow dividing system 210 of FIG. 8, the mass flow controller 222 maintains a flow rate through the second line 216 substantially equal to the measured flow rate of the first line 214. Although not shown, the flow divider system 210 can be provided with a controller for proportionally adjusting the signal indicative of the measured flow rate from the mass flow meter 218 prior to the signal being received by the mass flow controller 222, such that the mass flow controller 222 maintains a flow rate through the second line 216 substantially equal to a predetermined ratio of the measured flow rate of the first line 214. The system 210 is provided as a modular unit for quick and easy assembly between a gas box and a process chamber(s), and includes a shut-off valve or suitable connector 250 between the inlet manifold 212 of the system 210 and the outlet manifold 128 of the gas box 110

Referring again to FIG. 1, the presently disclosed mass flow ratio system 10 includes an inlet line or manifold 12 for receiving the single gas flow from the outlet manifold 128 of the gas box 110, and first and second flow lines 14a, 14b connected to the inlet 12. Each line 14a, 14b is provided with a mass flow meter 18a, 18b measuring mass flow through the line and providing a signal indicative of the measured flow, and a valve 20a, 20b controlling flow through the line based on a signal indicative of a desired flow ratio setting. The ratio system 10 also has a user interface 22 for receiving a desired flow ratio, and a controller 24 connected to the flow meters 18a, 18b, the valves 20a, 20b and the user interface 22. The flow ratio "α" is defined herein as the flow "$Q_2$" through the second line 14b divided by the flow "$Q_1$" through the first line 14a.

Referring also to FIG. 2, the controller 24 is programmed to receive the desired ratio of flow through the user interface 22, as shown at 30, receive the signals indicative of measured flow from the flow meters 18a, 18b, as shown at 32, calculate an actual ratio of flow through the flow lines 14a, 14b based upon the measured flow, as shown at 34, and compare the actual ratio to the desired ratio, as shown at 36. The controller 24 is also programmed to calculate the desired flow through at least one of the flow lines 14a, 14b if the actual ratio is unequal to the desired ratio, as shown at 38, and provide an "adjustment" signal indicative of the desired flow to at least one of the valves 20a, 20b, as shown at 40. The controller 24, therefore, adjusts flow through at least one of the flow lines 14a, 14b until the actual ratio of flow through the lines equals the desired ratio.

In a preferred embodiment, the controller 24 is programmed to provide an "initial" signal to the valve 20a of the first line 14a indicative of a first desired flow, calculate a second desired flow if the actual flow ratio is unequal to the desired flow ratio, and provide an "adjustment" signal to the valve 20b of the second flow line 14b indicative of the second desired flow. The "adjustment" signal is calculated by $$V_{c2}=K_{pa}(\alpha-\alpha_{sp})+K_{ia}\int(\alpha-\alpha_{sp})dt$$

Wherein $V_{c2}$ is the command from the controller 24 to the second valve 20b, $K_{pa}$ is a proportional gain for the ratio control, $K_{ia}$ is an integral gain for the ratio control, $\alpha$ is the measured flow ratio, and $\alpha_{sp}$ is the ratio set point or desired flow ratio. In this manner, the valve 20a of the first line 14a acts as a fixed orifice, while the valve 20b of the second line 14b acts as a variable control valve. This feature allows the system 10 to operate independently of the type of gas(es) controlled through the system, since errors in flow measurement due to differing gases are the same for both flow meters 18a, 18b. Preferably, the controller 24 is programmed to cause the valve 20a of the first line 14a to fully open, such that the overall pressure drop across the system 10 is minimized.

Figure 3:
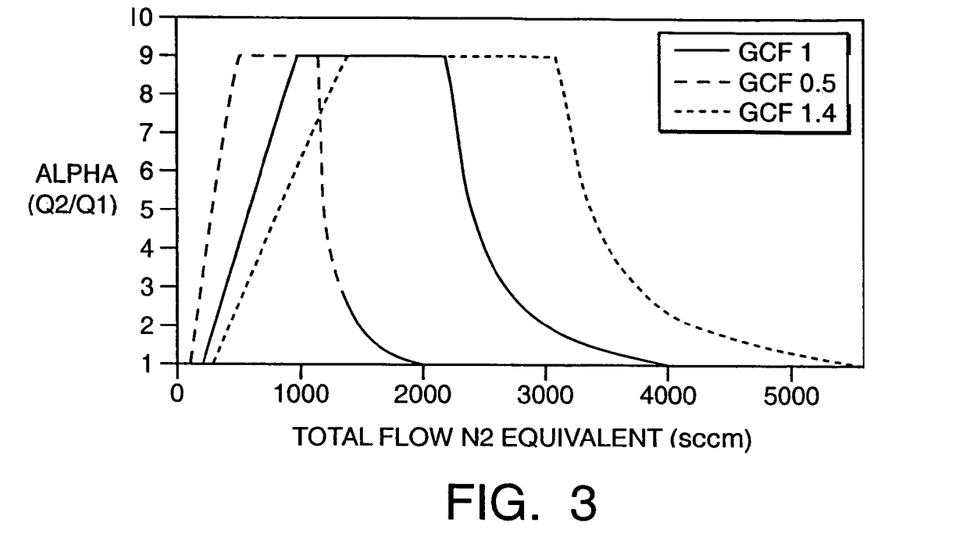
FIGS. 3 and 4 are graphs illustrating mass flow ratio control ranges of the system and method of FIGS. 1 and 2 for different minimum flows.
Figure 4:
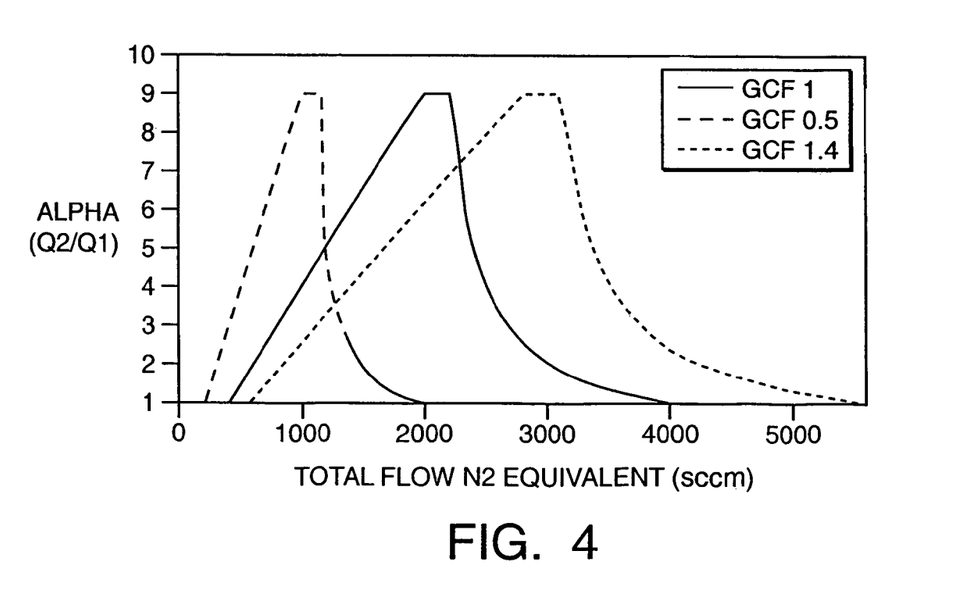

Examples of suitable mass flow meters 18a, 18b for use with the ratio system 10 of the present disclosure are thermally based Mass-Flo® brand controllers available from the assignee of the present disclosure, MKS Instruments of Andover, Mass. (http://www.mksinst.com). Suitable valves 20a, 20b are also available from the assignee. The valves 20a, 20b are non-linear and have a narrow controllable range. The thermal flow meters 18a, 18b, however, are the limiting factor in determining a control range provided by the system 10, since the flow meters are not normally reliable below five percent of the maximum sensor range (e.g., a 2,000 sccm thermal flow meter is not reliable below 100 sccm). FIGS. 3 and 4 are graphs illustrating ratio control ranges of a system 10 constructed in accordance with the present disclosure, based on the limiting range of the thermal flow meters. The graph of FIG. 3 is for a minimum flow rate ("Qmin") of 100 sccm through the system 10, while the graph of FIG. 4 is for a minimum flow rate of 200 sccm. Both graphs are based upon a flow of Nitrogen ($N_2$), and include plots for three gas correction factors ("GCF"); 0.5, 1.0, and 1.4.

Figure 5:
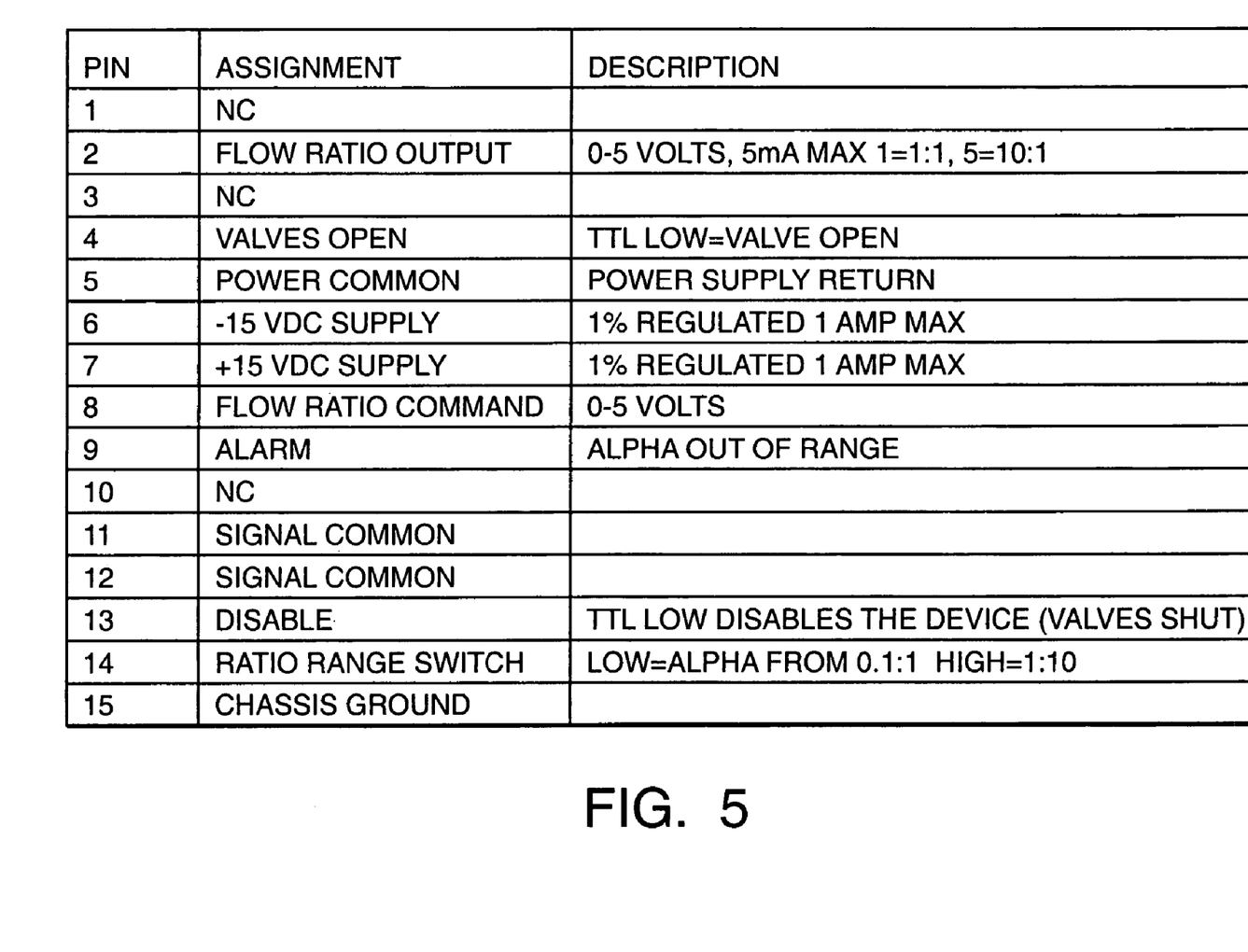
FIG. 5 is a table illustrating an exemplary embodiment of a user interface connection for the system of FIG. 1.

FIG. 5 is a table illustrating an exemplary embodiment of a connector of the user interface 22 for the flow ratio system 10 of FIG. 1. As shown, the connector comprises a 15 pin D connector, and the assignments and description for each pin are suggested. Although not shown, the controller 24 may include a microprocessor, memory, an electronic clock oscillator, an analog to digital converter and a multiplexer, for example.

Figure 6:
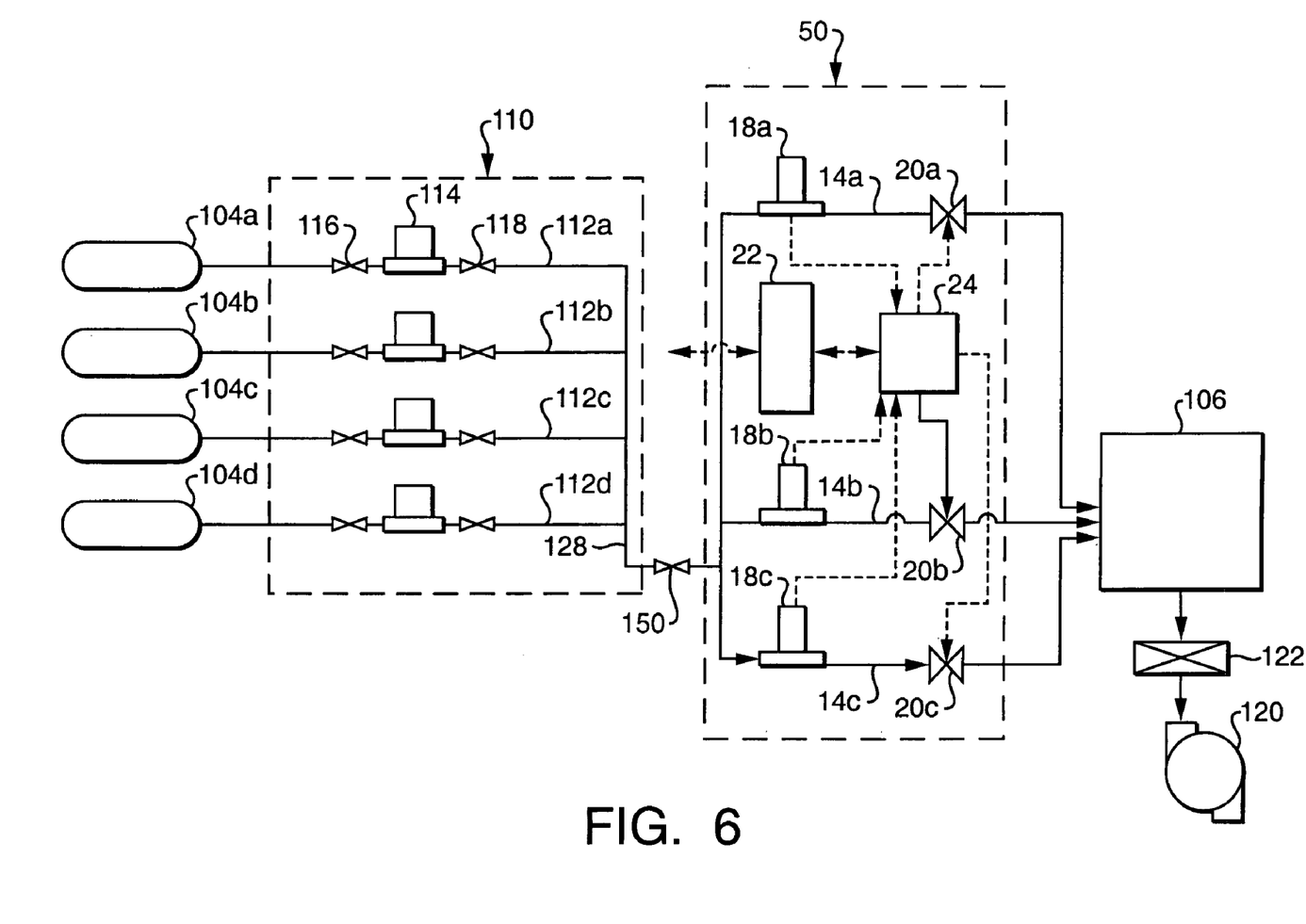
FIG. 6 is a schematic illustration of another mass flow ratio system constructed in accordance with the present disclosure, and shown connected between a gas metering box and multiple portions of a process chamber.

Referring to FIG. 6, another mass flow ratio system 50 constructed in accordance with the present disclosure is shown. The systems 10 and 50, respectively, of FIGS. 1 and 6 are similar, and elements that are the same have the same reference characters. The system 50 of FIG. 6 further includes a third flow line 14c connected to the inlet 12, and a mass flow meter 18c measuring mass flow through the line 14c and providing a signal indicative of the measured flow, and a valve 20c controlling flow through the line 14c based on a signal indicative of a desired flow rate. As shown, the three lines 14a, 14b, 14c of the system 30 can be connected to three portions of a single process chamber 106.

In the embodiment of FIG. 6, the user interface 24 is preferably adapted to receive a desired ratio of flow for the second and the first flow lines 14b, 14a, and a desired ratio of flow for the third and the first flow lines 14c, 14a (i.e., "$\alpha_1$"="$Q_2$"/"$Q_1$" and "$\alpha_2$"="$Q_3$"/"$Q_1$") controller 24 is programmed to provide a signal to the valve 20a of the first line 14a indicative of a first desired flow, thereby making the valve 20a a fixed orifice. Preferably, the valve 20a is fully opened. The controller 24 then receives the desired ratios of flow through the user interface 22, receives the signals indicative of measured flow from the flow meters 18a, 18b, calculates an actual ratio of flow for the second and the first flow lines 14b, 14a based upon the measured flows through the second and the first flow lines, calculates a second desired flow if the actual ratio for the second and the first flow lines is unequal to the desired ratio for the second and the first flow lines, and provides a signal to the valve 20b of the second flow line 14b indicative of the second desired flow.

The controller 24 is also programmed to calculate an actual ratio of flow for the third and the first flow lines 14c, 14a based upon the measured flows through the third and the first flow lines, calculate a third desired flow if the actual ratio for the third and the first flow lines is unequal to the desired ratio for the third and the first flow lines, and provide a signal to the valve 20c of the third flow line indicative of the third desired flow. The valves 20b, 20c of the second and third lines 14b, 14c, therefore, act as control valves with respect to the valve 20a of the first line 14a.

Although not shown, the mass flow ratio systems 10, 30 can be provided with more than three flow lines 14, with each additional flow line having a valve 20 and a flow meter 18 connected to the controller 24. In addition, it is envisioned that a mass flow controller can be used as the mass flow meter and the valve of each line. Although not shown, it is envisioned that the disclosed ratio systems 10, 30 each can be provided as a modular unit for quick and easy assembly between a gas box and a process chamber(s). In such a case, a shut-off valve or suitable connector 150 might be provided between the inlet manifold 12 of the ratio systems 10, 30 and the outlet manifold 128 of the gas box 110, as shown in FIGS. 1 and 6.

Embodiments of a system and a method for dividing flow according to the present invention can further include a pressure sensor for the inlet 12 and/or outlets of the systems 10 and 50. The inlet pressure and/or the outlet pressure measurement provided by the pressure sensor(s) is used by the controller 24 to not only control the ratio "α" of the flows, but also control the inlet pressure and/or the outlet pressures.

Adding a pressure control feature has a number of ancillary benefits, including improving the performance of each systems 10 and 50 reducing disturbances to devices upstream or downstream of each of the systems 10 and 50. By operating each of the systems 10 and 50 at the maximum allowable pressures, the need for factors of safety in the ratio control system can be removed or reduced. In addition, controlling the pressure drop across the valves 20a, 20b improves valve performance and makes valve setup, matching, and tuning more simple. The present disclosure is intended, therefore, to include a system and a method for dividing flow, with any added pressure control features. For example, the present disclosure may include the flow divider system 10 or 50, plus a pressure sensor(s) not shown in the inlet and/or the outlets of the system. The present disclosure may also include a method 28 of dividing flow plus measuring pressure(s) in the inlet and/or the outlets. In effect, the present application may include any control methodologies using pressure measurements for the claimed flow dividing system and method.

The following example is made with reference to FIG. 1. Assuming the addition of a pressure sensor (not shown) on the inlet 12 of the mass flow ratio system 10, the controller 24 is programmed to take three inputs: the flow "$Q_2$" through the second line 14b; the flow "$Q_1$" through the first line 14a; and a measured pressure "$P_{in}$" at the inlet 12 as provided by the pressure sensor (not shown). The controller 24 is programmed to issue commands to both of the first and the second valves 20a, 20b dynamically, instead of just controlling one valve at a time. However, in terms of ratio control, the "fixed valve" is mostly open, while the ratio is determined by controlling the other valve between 10% and 50% of a control range of the valve. With the addition of the pressure signal the fixed valve is set to control the inlet pressure, and the other valve is used to control the flow ratio. An example of an inlet pressure control could be written as:

$$V_{c1} = K_{pa}(\alpha - \alpha_{sp}) + K_{ia}\int(\alpha - \alpha_{sp})dt$$

$$V_{c2} = K_{pp}(P_{in} - P_t) + K_{ip}\int(P_{in} - P_t)dt$$

Wherein $V_{c1}$ is the command from the controller 24 to the first valve 20a, and $V_{c2}$ is the command to the second valve 20b, $K_{pp}$ is a proportional gain for pressure control, $K_{ip}$ is an integral gain for the pressure control, $K_{pa}$ is a proportional gain for the ratio control, $K_{ia}$ is an integral gain for the ratio control, $\alpha$ is the measured flow ratio, $\alpha_{sp}$ is the ratio set point or desired flow ratio, $P_{in}$ is the measured inlet pressure, and $P_t$ is an operating pressure threshold (or a desired pressure).

While the control system and method is described as a proportional-plus-integral (PI) type control system and method, it should be appreciated that other types of control systems and methods can be used, such as proportional, integral, proportional-plus-derivative (PD), and proportional-plus-integral-plus-derivative (PID) types of control systems and methods.

While there have been illustrated and described particular embodiments of the present disclosure, it will be appreciated that numerous changes and modifications will occur to those skilled in the art. Accordingly, it is intended that the appended claims cover all those changes and modifications which fall within the true spirit and scope of the present disclosure.

What is claimed is:

1. A system for dividing a single mass flow, from a system inlet into two or more secondary flows through two or more secondary flow lines in accordance with a preselected ratio of flow rates through the secondary flow lines, comprising:
   A) the system inlet adapted to receive the single mass flow;
   B) at least two of the secondary flow lines connected to the inlet, each secondary flow line including,
      a flow meter measuring flow through the secondary flow line and providing a signal indicative of the measured flow, and
      a valve controlling flow through the secondary flow line based upon a signal indicative of desired flow rate through the secondary flow line;
   C) a user interface adapted to receive the setting of the preselected ratio of flows; and
   D) a controller connected to each of the flow meters, and the valves of the secondary flow lines, and the user interface, and programmed to,
      receive through the user interface, the setting of the preselected ratio of flows through the secondary flow lines,
      receive the signals indicative of measured flow from the flow meters of each of the secondary flow lines,
      calculate an actual ratio of flow through the flow lines based upon the measured flow, wherein said calculation is made without reference to the total flow received at the inlet, nor to the sum total of the secondary flows through the secondary flow lines,
      compare the actual ratio to the desired ratio,
      calculate the desired flow through at least one of the flow lines if the actual ratio is unequal to the desired ratio, and
      provide a signal indicative of the desired flow to at least one of the valves.

2. A system according to claim 1, wherein the flow meters are thermal-based.

3. A system according to claim 1, wherein:
   the secondary flow lines comprise first and second flow lines; and
   the controller is programmed to,
      provide a signal to the valve of the first flow line indicative of a first desired flow,
      calculate a second desired flow if the actual ratio is unequal to the desired ratio, and
      provide a signal to the valve of the second flow line indicative of the second desired flow.

4. A system according to claim 3, wherein the first desired flow causes the valve of the first line to fully open.

5. A system according to claim 3, wherein the ratio of flow is equal to the flow through the second flow line divided by the flow through the first flow line.

6. A system according to claim 5, wherein an allowable range for the desired ratio of flow is between about 1 and about 10.

7. A system according to claim 1, wherein:
   the secondary flow lines comprise first, second and third flow lines;
   the user interface is adapted to receive a desired ratio of flow for the second and the first flow lines, and a desired ratio of flow for the third and the first flow lines; and
   the controller is programmed to,
      provide a signal to the first valve indicative of a first desired flow through the first flow line,
      receive the desired ratios of flow through the user interface,
      receive the signals indicative of measured flow from the flow meters,
      calculate an actual ratio of flow for the second and the first flow lines based upon the measured flows through the second and the first flow lines,
      calculate a second desired flow if the actual ratio for the second and the first flow lines is unequal to the desired ratio for the second and the first flow lines,
      provide a signal to the valve of the second flow line indicative of the second desired flow, wherein the second desired flow is substantially equal to $K_p(\alpha_2 -$ $\alpha_{2sp})+K_i\int(\alpha_{2-\alpha2sp})dt$, wherein $K_p$ is a proportional gain, $K_i$ is an integral gain, $\alpha_2$ is the actual flow ratio for the second and the first flow lines, and $\alpha_{2sp}$ is the desired flow ratio for the second and the first flow lines, calculate an actual ratio of flow for the third and the first flow lines based upon the measured flows through the third and the first flow lines, calculate a third desired flow if the actual ratio for the third and the first flow lines is unequal to the desired ratio for the third and the first flow lines, and provide a signal to the valve of the third flow line indicative of the third desired flow, wherein the third desired flow is substantially equal to $K_p(\alpha_3-\alpha_{3sp})+K_i\int(\alpha_3-\alpha_{3sp})dt$, wherein $K_p$ is a proportional gain, $K_i$ is an integral gain, $\alpha_3$ is the actual flow ratio for the third and the first flow lines, and $\alpha_{3sp}$ is the desired flow ratio for the third and the first flow lines.

8. A system according to claim 7, wherein the first desired flow causes the valve of the first flow line to fully open.

9. A system according to claim 7, wherein the first ratio of flow is equal to the flow through the second flow line divided by the flow through the first flow line, and the second ratio of flow is equal to the flow through the third flow line divided by the flow through the first flow line.

10. A system according to claim 9, wherein an allowable range for each desired ratio of flow is between about 1 and about 10.

11. A system according to claim 1, further comprising a pressure sensor measuring pressure in one of (a) the inlet and the (b) secondary flow lines, and connected to the controller to provide the pressure measurement to the controller.

12. A system according to claim 11, wherein the pressure sensor measures pressure in the inlet.

13. A system according to claim 1, wherein the signal indicative of the desired flow to at least one of the valves corresponds to an orifice setting of the valve.

14. A system according to claim 13, wherein the orifice setting of the valve is maintained by regulating either current or voltage supplied to a solenoid.

15. A system according to claim 1, wherein the desired flow is substantially equal to $K_p(\alpha-\alpha_{sp})+K_i\int(\alpha-\alpha_{sp})dt$, wherein $K_p$ is a proportional gain, $K_i$ is an integral gain, $\alpha$ is the actual flow ratio, and $\alpha_{sp}$ is the desired flow ratio.

16. A system according to claim 12, wherein the controller is programmed to provide a signal indicative of the desired flow to the valve of the first flow line substantially equal to $K_{p\alpha}(\alpha-\alpha_{sp})+K_{i\alpha}\int(\alpha-\alpha_{sp})dt$, wherein $K_p$ is a proportional gain for ratio control, $K_i$ is an integral gain for ratio control, $\alpha$ is the actual flow ratio, and $\alpha_{sp}$ is the desired flow ratio.

17. A system according to claim 12, wherein the controller is programmed to provide a signal indicative of the desired flow to the valve of the second flow line substantially equal to $K_p(P_{in}-P_t)+K_i\int(P_{in}-P_t)dt$, wherein $K_p$ is a proportional gain for pressure control, $K_i$ is an integral gain for pressure control, $P_{in}$ is the measured inlet pressure, and $P_t$ is an operating pressure threshold.

18. A method of dividing a single mass flow into two or more secondary mass flows accordance with a preselected ratio, comprising:

A) receiving a setting of the desired preselected ratio of mass flow through the secondary flow lines;

B) receiving the single mass flow into an inlet and dividing the single mass flow into at least two secondary flow lines connected to the inlet, C) measuring mass flow through each secondary flow line;

D) calculating an actual ratio of mass flow through the secondary flow lines based upon the measured flows, wherein said calculation is made without reference to the total mass flow through the inlet, nor the sum total of the mass flows through the secondary flow lines;

E) calculating a desired flow through at least one of the secondary flow lines if the actual ratio does not equal the desired ratio; and F) regulating the flow line to the desired flow through the at least one of the secondary flow lines.

19. A method according to claim 18, wherein:

the single mass flow is divided into first and second flow lines;

the first flow line is regulated to a first desired flow;

a second desired flow is calculated using the desired ratio and the first desired flow if the actual ratio is unequal to the desired ratio; and the second flow line is regulated to the second desired flow.

20. A method according to claim 19, wherein the first desired flow causes the first flow line to be fully open.

21. A method according to claim 19, wherein the ratio of flow is equal to the flow through the second flow line divided by the flow through the first flow line.

22. A method according to claim 18, wherein an allowable range for the desired ratio of flow is between about 1 and about 10.

23. A method according to claim 18, wherein:

the single mass flow is divided into first, second and third flow lines;

first and second desired ratios of mass flow are received;

the first flow line is regulated to a first desired flow;

a second desired flow is calculated using the first desired ratio and the first desired flow if the actual ratio of the first and the second flow lines is unequal to the desired first ratio, wherein the second desired flow is substantially equal to $K_p(\alpha_2-\alpha_{2sp})+K_i\int(\alpha_{2-\alpha2sp})dt$, wherein $K_p$ is a proportional gain, $K_i$ is an integral gain, $\alpha_2$ is the actual flow ratio for the second and the first flow lines, and $\alpha_{2sp}$ is the desired flow ratio for the second and the first flow lines;

the second flow line is regulated to the second desired flow;

a third desired flow is calculated using the second desired ratio and the first desired flow if the actual ratio of the first and the third flow lines is unequal to the desired second ratio, wherein the third desired flow is substantially equal to $K_p(\alpha_3-\alpha_{3sp})+K_i\int(\alpha_3-\alpha_{3sp})dt$, wherein $K_p$ is a proportional gain, $K_i$ is an integral gain, $\alpha_3$ is the actual flow ratio for the third and the first flow lines, and $\alpha_{3sp}$ is the desired flow ratio for the third and the first flow lines; and the third flow line is regulated to the third desired flow.

24. A method according to claim 23, wherein the first desired flow causes the first flow line to be fully open.

25. A method according to claim 23, wherein the ratios of flow of the first and the second flow lines are equal to the flow through the second flow line divided by the flow through the first flow line, and the ratios of flow of the first and the third flow lines are equal to the flow through the third flow line divided by the flow through the first flow line.

26. A method according to claim 25, wherein an allowable range for each of the desired ratios of flow is between about 1 and about 10.

27. A method according to claim 18, wherein mass flows are measured using thermally-based flow meters.

28. A method according to claim 18, further comprising measuring pressure in one of (a) the inlet and (b) the secondary flow lines.

29. A method according to claim 28, wherein pressure in the inlet is measured.

30. A method according to claim 18, wherein a desired orifice setting for the flow line is calculated to produce the desired flow, and an orifice setting of the flow line is regulated to match the desired orifice setting.

31. A method according to claim 30, wherein an orifice setting of the flow line is regulated by regulating either current or voltage supplied to a solenoid.

32. A method according to claim 18, wherein the desired flow is substantially equal to $K_p(\alpha-\alpha_{sp})+K_i\int(\alpha-\alpha_{sp})dt$, wherein $K_p$ is a proportional gain, $K_i$ is an integral gain, $\alpha$ is the actual flow ratio, and $\alpha_{sp}$ is the desired flow ratio.

33. A method according to claim 29, wherein the desired flow in one of the flow lines is substantially equal to $K_{p\alpha}(\alpha-\alpha_{sp})+K_{i\alpha}\int(\alpha-\alpha_{sp})dt$, wherein $K_p$ is a proportional gain for ratio control, $K_i$ is an integral gain for ratio control, $\alpha$ is the actual flow ratio, and $\alpha_{sp}$ is the desired flow ratio.

34. A method according to claim 29, wherein the desired flow in one of the flow lines is substantially equal to $K_p(P_{in}-P_t)+K_i\int(P_{in}-P_t)dt$, wherein $K_p$ is a proportional gain for pressure control, $K_i$ is an integral gain for pressure control, $P_{in}$ is the measured inlet pressure, and $P_t$ is an operating pressure threshold.

35. A system for dividing a single mass flow provided at a system inlet into two or more secondary flows through two or more secondary flow lines in accordance with a desired ratio, comprising:
   a plurality of secondary flow lines, each of the secondary flow lines including:
      (i) a flow meter for providing a flow signal as a function of the actual flow though the secondary flow line, and
      (ii) a control valve responsive to a control signal for controlling the flow through the secondary flow line; and
   a controller configured and arranged so as to:
      (a) receive a ratio setting input representing the desired flow ratio and the flow signal from each of the flow meters,
      (b) provide the control signal to each of the control valves,
      (c) calculate an actual ratio of flow through the secondary flow lines based upon the actual flow through at least one of the secondary flow lines, wherein said calculation is made without reference to the total flow through the system inlet, nor the sum total of the secondary flows through the secondary flow lines, and
      (d) adjust one or more of the control signals applied to one or more of the control valves as a function of the difference between the actual ratio and desired ratio.

36. A system according to claim 35, wherein the flow meters are thermal-based.

37. A system according to claim 35, further comprising a pressure sensor measuring pressure in one of (a) the inlet and the (b) secondary flow lines, and connected to the controller to provide the pressure measurement to the controller.

38. A method of dividing a single mass flow provided at a system inlet into two or more secondary flows through two or more secondary flow lines in accordance with a desired ratio, the system comprising: (A) a plurality of secondary flow lines, each of the secondary flow lines including (i) a flow meter for providing a flow signal as a function of the actual flow though the secondary flow line, and (ii) a control valve responsive to a control signal for controlling the flow through the secondary flow line, and a controller, the method comprising:
   (a) receiving a ratio setting input representing the desired flow ratio and the flow signal from each of the flow meters,
   (b) providing the control signal to each of the control valves,
   (c) calculating an actual ratio of flow through the secondary flow lines based upon the actual flow through at least one of the secondary flow lines, wherein said calculation is made without reference to the total flow through the system inlet, nor the sum total of the secondary flows through the secondary flow lines, and
   (d) adjusting one or more of the control signals applied to one or more of the control valves as a function of the difference between the actual ratio and desired ratio.

39. A method according to claim 38, further comprising:
   measuring pressure in one of (a) the inlet and the (b) secondary flow lines, and
   providing a signal representing such measured pressure to the controller.

* * * * *